United States Patent
McAlister et al.

(10) Patent No.: US 6,598,159 B1
(45) Date of Patent: Jul. 22, 2003

(54) OPTION-ROM BOOT (75) Inventors: Lonnie D. McAlister, Escondido, CA (US); Vijay Oks, Hillsboro, OR (US); Burton W. Triplett, Hilsboro, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 09/605,551

(22) Filed: Jun. 27, 2000

(51) Int. Cl.⁷ .............................................. G06F 9/445
(52) U.S. Cl. ........................................... 713/2; 709/222
(58) Field of Search ............... 713/2; 709/222

(56) References Cited

U.S. PATENT DOCUMENTS

| | | | | |
|---|---|---|---|---|
| 5,577,210 A | * | 11/1996 | Abdous et al. ............ 709/219 |
| 5,675,800 A | * | 10/1997 | Fisher, Jr. et al. ............ 713/2 |
| 5,842,011 A | * | 11/1998 | Basu ............................ 713/2 |
| 6,282,642 B1 | * | 8/2001 | Cromer et al. ................ 713/2 |
| 6,292,890 B1 | * | 9/2001 | Crisan ......................... 713/2 |
| 6,463,530 B1 | * | 10/2002 | Sposato ....................... 713/2 |
| 6,532,537 B1 | * | 3/2003 | Chen et al. .................. 713/2 |

* cited by examiner

*Primary Examiner*—Thomas M. Heckler
(74) *Attorney, Agent, or Firm*—Blakely, Sokoloff, Taylor & Zafman LLP (57) ABSTRACT

A remote boot wrapper receives boot parameters from a basic input-output system (BIOS) of an electronic system. The boot parameters are received during a system boot of the electronic system. Based at least in part on the boot parameters, the remote boot wrapper determines if a quick remote boot is enabled. If the quick remote boot is enabled, a remote boot configuration interface is bypassed. If the quick remote boot is not enabled, the remote boot configuration interface is performed.

29 Claims, 5 Drawing Sheets

OPTION-ROM BOOT

FIELD OF THE INVENTION

The present invention pertains to the field of BIOS (Basic Input-Output System). More particularly, this invention relates to remote boot agents or option-ROM (Read Only Memory) boot procedures.

BACKGROUND

BIOS (Basic Input-Output System) is the software that a computer uses to get the computer started, or to "boot" ("boot" means hardware initialization of the system electronics in this case) the computer. Most computer software, such as an operating system and applications program, is stored in a computer's RAM (Random Access Memory) while in use. RAM is temporary, or volatile, memory. That is, the software is lost when the computer is turned off, and needs to be re-loaded the next time the computer is turned on. BIOS, however, is usually stored in ROM (Read Only Memory). ROM is permanent, or non-volatile, memory. That is, BIOS is not lost when a computer is turned off. Since BIOS is usually stored in ROM, BIOS is sometimes referred to as BIOS ROM or boot ROM.

Typically, when a computer is turned on, a microprocessor inside the computer goes to a predetermined place in ROM to find the BIOS and begin executing it. Among the first things that BIOS instructs the microprocessor to do is a POST (Power-On Self Test). A POST is usually done to initialize the computer's various components to make sure they are operational prior to loading the operating system. When POST is successfully complete, the BIOS loads the operating system into RAM, usually from a hard drive. When the operating system is loaded, the computer is ready for use.

Of course, different computers have different components. For instance, computers may include or be connected to any of a variety of peripheral devices and/or networks. Depending on which components a computer has, a POST may work with various optional routines or agents to initialize interaction with the computer's various components. Like BIOS, these optional routines or agents are usually stored in ROM. They are sometimes referred to as option ROM, option boot ROM, option BIOS, or remote boot ROM. As used herein however, these routines or agents will generally be referred to as remote boot agents.

A remote boot agent can be used to perform virtually any optional initialization task for virtually any computer component. A "diskless" computer provides an example of how a remote boot agent may be used. A diskless computer does not have a local hard drive so it has no place to store operating system files. Instead, the computer relies on a network to store the operating system files for it. When the computer is turned on, a POST initiates a remote boot agent. The remote boot agent searches the network to find a boot server. When it finds the boot server, the agent downloads whatever information the computer needs to finish booting. For instance, the agent may download the needed operating system files or the agent may download instructions to enable the BIOS to download the operating system files after POST is complete.

A remote boot wrapper can be used to manage a number of remote boot agents. For instance, a computer may include several different remote boot agents, each designed to work with a different network protocol. All of the agents can be bundled within one remote boot wrapper. During POST, a remote boot wrapper can be configured to activate the appropriate remote boot agent(s) depending on the type of network and/or peripherals to which the computer is coupled. The remote boot wrapper displays a window including a prompt to enter a configuration mode. The remote boot wrapper will delay the overall boot procedure for a certain minimum time to give a user an opportunity to enter the configuration mode. A typical minimum delay is four seconds.

The format of the configuration mode depends on the type and number of remote boot agents that the remote boot wrapper is managing. For instance, the user may be presented with a menu to select from among a number remote boot agents for different network protocols, as well as menus or submenus to display and change various network protocol settings for each agent.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Many typical computer users do not need or want to know how their computers operate. They just want to turn their computers on and begin working as soon as possible. As discussed more fully below, embodiments of the present invention improve remote boot agent procedures by reducing boot time and simplifying user interaction during a normal boot operation. In general, embodiments of the present invention provide for a quick remote boot procedure that reduces delay and potential confusion associated with configuring a remote boot wrapper.

Figure 1:
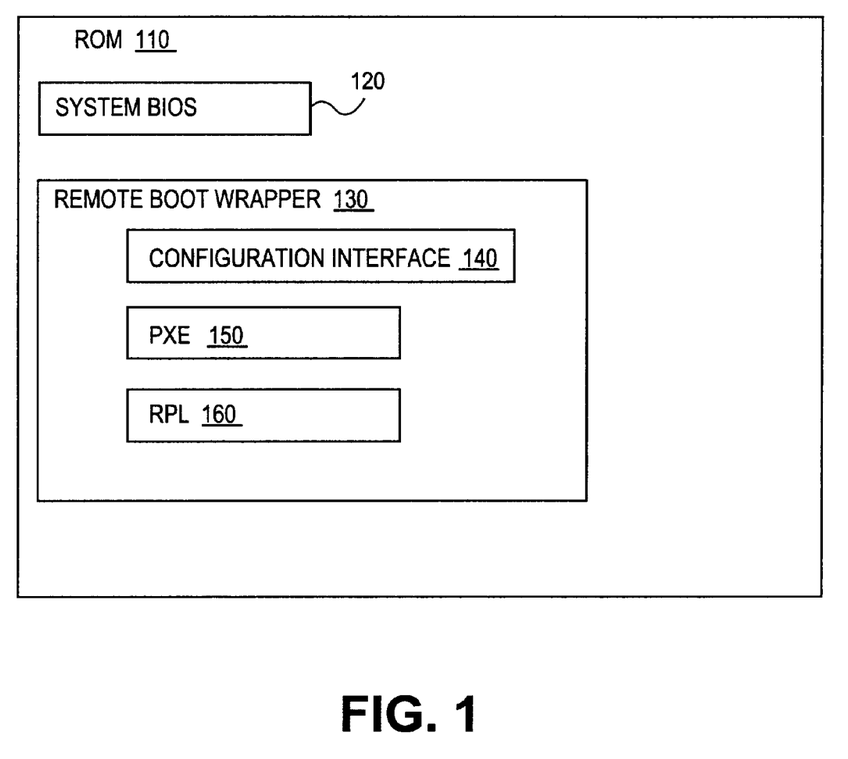
FIG. 1 illustrates one embodiment of BIOS and remote boot agents stored in ROM.

FIG. 1 illustrates one embodiment of the present invention. In FIG. 1, a read only memory (ROM) 110 includes a system level basic input-output system (BIOS) 120. As discussed above, system BIOS 120 is the software that a computer system (not shown) uses to get the computer started, or to "boot" the computer. As used herein, the term computer refers to virtually any electronic system that uses BIOS, such as personal computers (PCs), personal data assistants (PDAs), diskless systems, and the like.

Also stored in ROM 110 is remote boot wrapper 130. Remote boot wrapper 130 includes a configuration interface 140 to manage and configure one or more remote boot agents. In the illustrated embodiment, the remote boot agents include PXE (preboot execution environment) 150 for initializing a network connection for a Microsoft network operating system and RPL (remote program load) 160 for initializing a network connection for remote program execution.

RPL is not dependent on a network operating system. RPL is a precusor to PXE, and simply downloads a program over the network and executes it on the client. PXE expands on RPL to provide more comprehensive access to network resources.

In alternate embodiments, remote boot wrapper 130 could include any number of remote boot agents in addition to, or in place of, PXE 150 and RPL 160. For instance, remote boot wrapper 130 could include remote boot agents for initializing peripheral components such as small computer system interface (SCSI) devices. Remote boot agents could also be included for initializing network connections to any of a number of different kinds of networks, including local area networks (LANs), metropolitan area networks (MANs), and wide area networks (WANs).

Any of a number of different kinds of memories can be used for ROM 110. For instance, electrically erasable programmable read only memory (EEPROM) and/or flash EEPROM are common examples. ROM 110 may represent a single memory unit or multiple memory units. In alternate embodiments, system BIOS 120, remote boot wrapper 130 and its various components may all be stored in separate memory units, or in various combinations in more than one memory unit.

As discussed above, when a computer first turns on, a microprocessor in the computer goes to a predetermined place in ROM 110 to find system BIOS 120 and begin executing it. Among the first things system BIOS 120 does is a power on self test (POST). During POST, system BIOS 120 interacts with remote boot wrapper 130 to initialize one or more computer components.

One of the functions of remote boot wrapper 130 is to provide a user an opportunity to configure component initialization based on the components to which the computer is coupled. For instance, if the computer is needs expanded access to network resources, a user should configure remote boot wrapper 130 to use PXE 150 to initialize the network connection rather than RPL 160.

Figure 2:
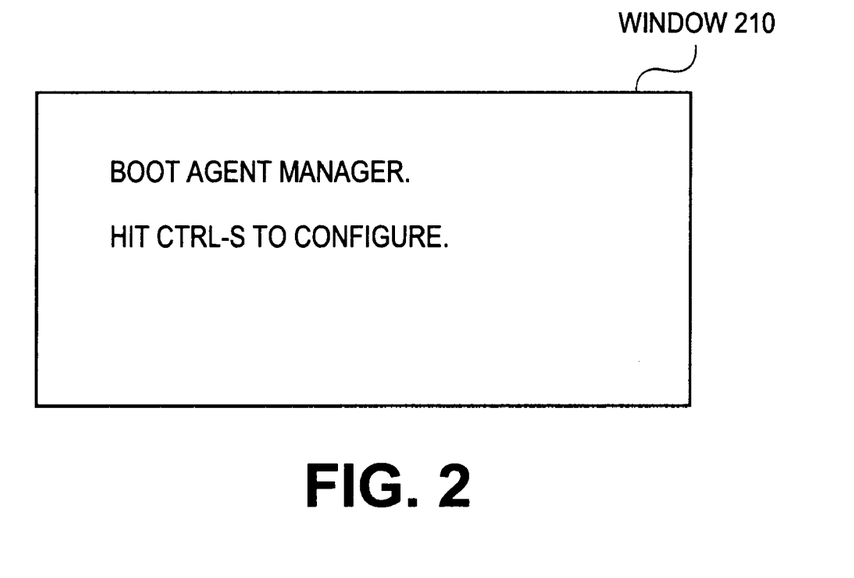
FIG. 2 illustrates one embodiment of a window provided as part of a configuration interface (or "wrapper" program) to provide a user an opportunity to configure the remote boot wrapper.
Figure 3:
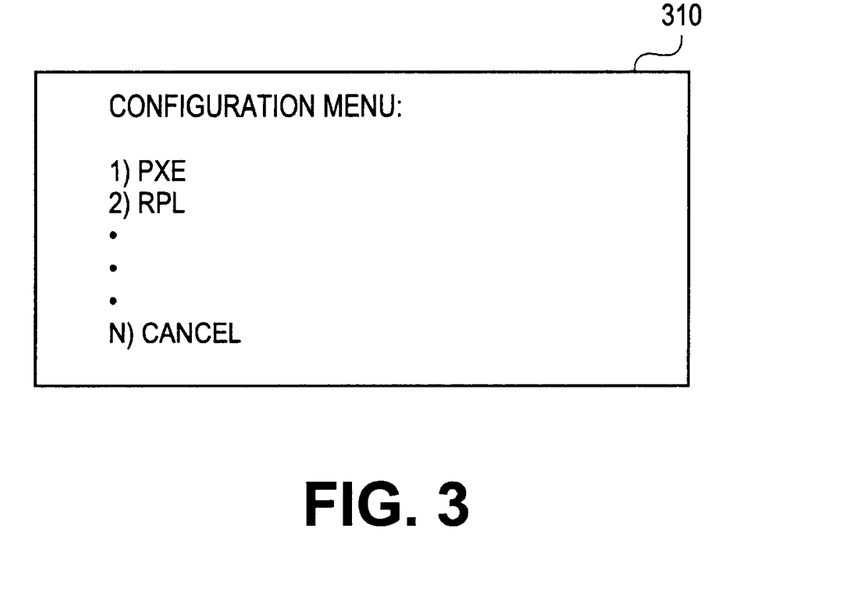
FIG. 3 illustrates one embodiment of a configuration mode provided as part of a configuration interface of a remote boot wrapper.

FIGS. 2 and 3 illustrate embodiments of a configuration interface. In FIG. 2, window 210 is used by remote boot wrapper 130 to provide a user an opportunity to configure component initialization. If a user wishes to access the configuration mode, the user can enter a key command-Control-S in the illustrated embodiment. The system boot process is delayed for at least a minimum amount of time to display window 210 and to give a user a chance to read the window and enter the key command. In one embodiment, the delay is a minimum of four seconds.

FIG. 3 illustrates one example of a configuration menu 310 that may be provided if a user were to access the configuration mode. Configuration menu 310 may be just the first in a series of configuration windows depending on which option the user selects in menu 310. That is, if the user selections the first menu item to configure PXE, the user may be presented with one or more additional windows for selecting any of a variety of configuration settings related to PXE. In alternate embodiments, any number of approaches can be used to give the user an opportunity to enter a configuration mode, and any number of approaches can be used to change or enter configuration settings.

In addition to adding delay to the system boot process, some computer users may become confused when given an option to configure a remote boot wrapper. For instance, a typical home or business user may not know or care what kind of peripheral(s) and/or network his or her computer is coupled to as long as it works. If the user enters the configuration mode for some reason, the user may inadvertently interfere with the proper initialization of the computer.

Figure 4:
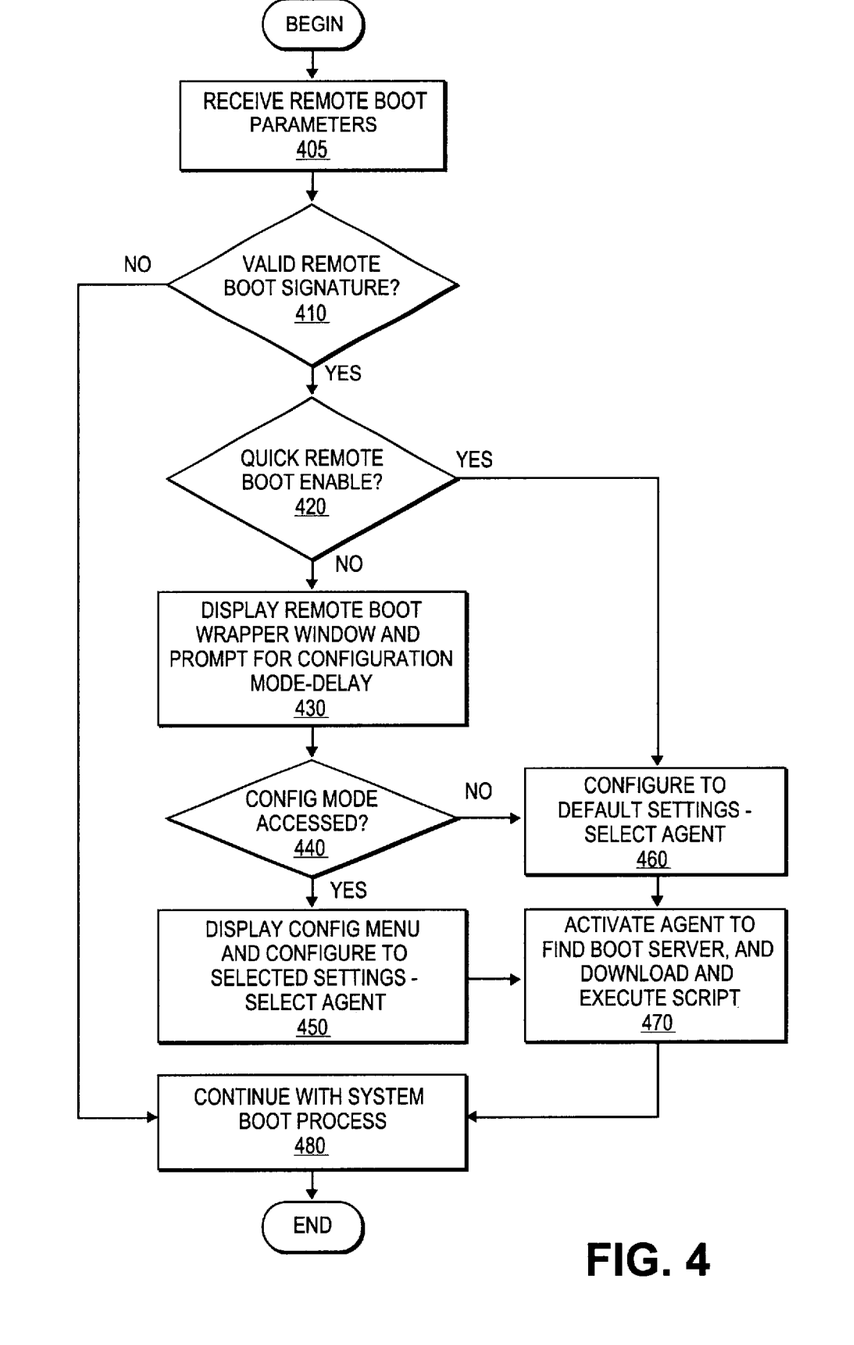
FIG. 4 demonstrates one embodiment of the present invention.

FIG. 4 demonstrates one embodiment of the present invention. In general, during a normal boot procedure, the illustrated embodiment of the present invention bypasses the remote boot configuration interface. That is, a user is not given an opportunity to configure initialization with respect to remote components. Instead, during a normal boot process, default settings, or settings from a previous boot, are used to initialize the computer components. Only under special circumstance, such as a diagnostic boot, would a user be given an opportunity to configure remote initialization. By skipping the remote boot configuration interface during normal boot procedures, the total boot duration is reduced by eliminating the configuration interface delay. Furthermore, the boot procedure is simplified, reducing the chances of inadvertent user interference.

Specifically, in block 405, the remote boot wrapper receives boot parameters from the system BIOS. The boot parameters can include a variety of information including a port location for a peripheral device, a network location for a boot server, and the like. The boot parameters also include an indication of what kind of boot procedure the BIOS wants to perform. Different boot parameters can be selected, for instance, by entering various key commands when powering on the computer.

In the illustrated embodiment, the boot parameters include a validation signature as one indication of the desired type of boot procedure. The validation signature is checked in block 410. If the signature is invalid, then the rest of the remote boot wrapper procedure is skipped altogether. In which case, the system boot process is simply continued in block 480 without activating any remote boot agents. For example, if the remote boot wrapper is configured to initialize a network connection under normal boot procedures, by intentionally skipping the initialization portion of the remote boot wrapper, the computer can boot up as a stand-alone computer as opposed to a networked computer. In one embodiment, the validation signature is an American standard code for information interchange (ASCII) value, such as "FAST" or "FULL." The ASCII value can be stored in ROM with the system BIOS.

If the validation signature is valid in block 410, then the remote boot wrapper continues to block 420. In block 420, a second parameter is checked to see if a quick remote boot is enabled. For instance, in one embodiment, the second parameter is one bit position in a binary field. If the bit position is set to one value, the quick remote boot is enabled. If the bit position is set to the other value, the quick remote boot is disabled. In alternate embodiments, any number of parameter formats can be used for the validation signature and to enable/disable quick remote boot.

The remote boot wrapper moves on to block 430 if the quick boot is disabled. In block 430, as discussed above, the remote boot wrapper displays a window and prompts a user to give him or her an opportunity to enter a configuration mode. While the window is displayed, the boot procedure is delayed. As mentioned above, a user may choose the slower remote boot procedure by, for instance, entering a key command while turning on the computer. Furthermore, a user may choose the slower procedure when, for instance, the user is attempting to diagnose a problem, or when the user is adding and/or removing computer components, and the user needs to view and/or change configuration settings.

If in block 420 the quick remote boot is enabled, or if in block 440 the configuration mode is not accessed, the remote boot wrapper proceeds to block 460. In block 460, the remote boot wrapper is configured with default settings. For example, in the illustrated embodiment, configuring with default settings includes selecting a remote boot agent. Configuring could also include selecting particular settings for the selected agent.

To select the default settings, the remote boot wrapper could simply select the same remote boot settings used in the previous boot. Alternately, the remote boot wrapper may store an indication of which remote boot settings to use as a defaults.

If in block 440, the configuration mode is accessed, the remote boot wrapper proceeds to block 450. In block 450, the remote boot wrapper displays one or more configuration menus and configures the remote boot wrapper according to selected settings. As in block 460, configuring the settings includes selecting a remote boot agent in the illustrated embodiment.

In block 470, a remote boot agent is activated. The activated agent is the agent that was selected either as a default in block 460 or by a user in block 450. In the illustrated embodiment, the remote boot agent is a network boot agent. In which case, the network boot agent finds a boot server on a network at any location on the network that is defined as a remote boot server. The network boot agent downloads and executes a script from the boot server. The script includes whatever information is needed to initialize the network connection. For instance, as discussed above for a diskless system, the script could include operating system files or instructions for the BIOS to download the operating system files. In alternate embodiments, any of a variety of remote bus agents could be selected in blocks 450 or 460 and activated in block 470 in place of or in addition to the illustrated network boot agent.

In block 480, the remote boot wrapper returns control to the BIOS to continue the system boot process.

Alternate embodiments may not include all of the elements illustrated in FIG. 4, may include additional elements, and/or may perform elements in a different order. For instance, for a diskless system, the computer may not be able to boot without initializing a network connection and downloading system files. In which case, block 410 may be removed so that the remote boot agent cannot be skipped.

Alternate embodiments may include multiple remote boot wrappers so that, for instance, remote boot agents may be grouped and categorized into separate remote boot wrappers. The remote boot wrappers may be tailored to configure the specific categories of grouped remote boot agents. In which case, the process of FIG. 4 and the boot parameters could be modified to select wrappers in a particular order and to loop back through the various configuration processes for each wrapper. If each wrapper introduces its own delay when its configuration interface is enabled, selectively bypassing one or more of the configuration interfaces could significantly reduce the overall system boot duration.

Alternate embodiments may activate multiple remote boot agents within one remote boot wrapper. For instance, a remote boot wrapper may include a variety of network boot agents and peripheral boot agents. In which case, the process of FIG. 4 and the boot parameters could be modified to select agents and loop back through configuration and activation of each. In which case, configuring, both default and interactive, could include not only which agents to use, but also in which order to activate them.

In yet another alternate embodiment, the functions described above for a remote boot wrapper could be incorporated into an individual remote boot agent. That is, one or more remote boot agents could include their own configuration interfaces, as well as the ability to selectively bypass them. A computer system may include both standalone remote boot agents and remote boot agents bundled into remote boot wrappers. In which case, the process of FIG. 4 and the boot parameters could be modified for one or more standalone remote boot agents and/or remote boot wrappers.

Figure 5:
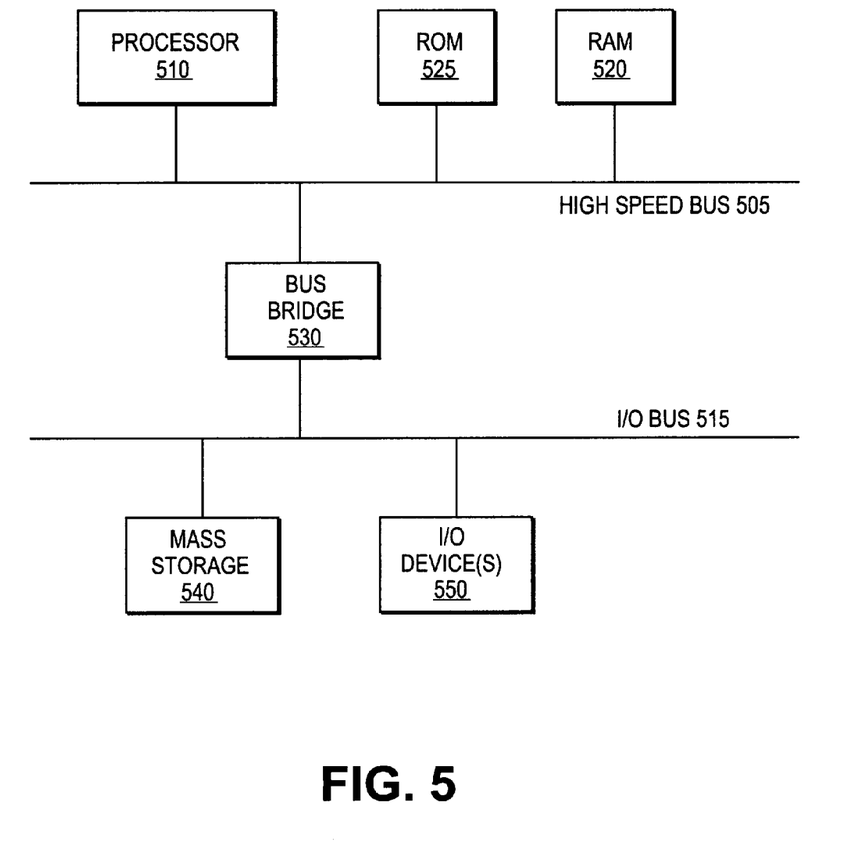
FIG. 5 illustrates one embodiment of a hardware system.

FIG. 5 illustrates one embodiment of a hardware system intended to represent a broad category of computer systems such as personal computers, workstations, and/or embedded systems. In the illustrated embodiment, the hardware system includes processor 510 coupled to high speed bus 505, which is coupled to input/output (I/O) bus 515 through bus bridge 530. Random access memory (RAM) 520 and read only memory (ROM) 525 are coupled to bus 505. Mass storage 540 is coupled to bus 515. I/O device(s) 550 is also coupled to bus 515. I/O device(s) 550 may include a display device, a keyboard, one or more external network interfaces, etc.

Certain embodiments may include additional components, may not require all of the above components, or may combine one or more components. For instance, ROM 525 and/or RAM 520 may be on-chip with processor 510. Alternately, mass storage 540 may be eliminated and ROM 525 and/or RAM 520 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented in one or more computers such as the hardware system of FIG. 5. For instance, system BIOS and remote boot wrapper(s) may be stored in ROM 525. Where more than one computer is used, the systems can be coupled to communicate over an external network, such as a local area network (LAN), an IP network, etc. For instance, a remote boot agent may interact with a boot server on a network through I/O device(s) 550.

Figure 6:
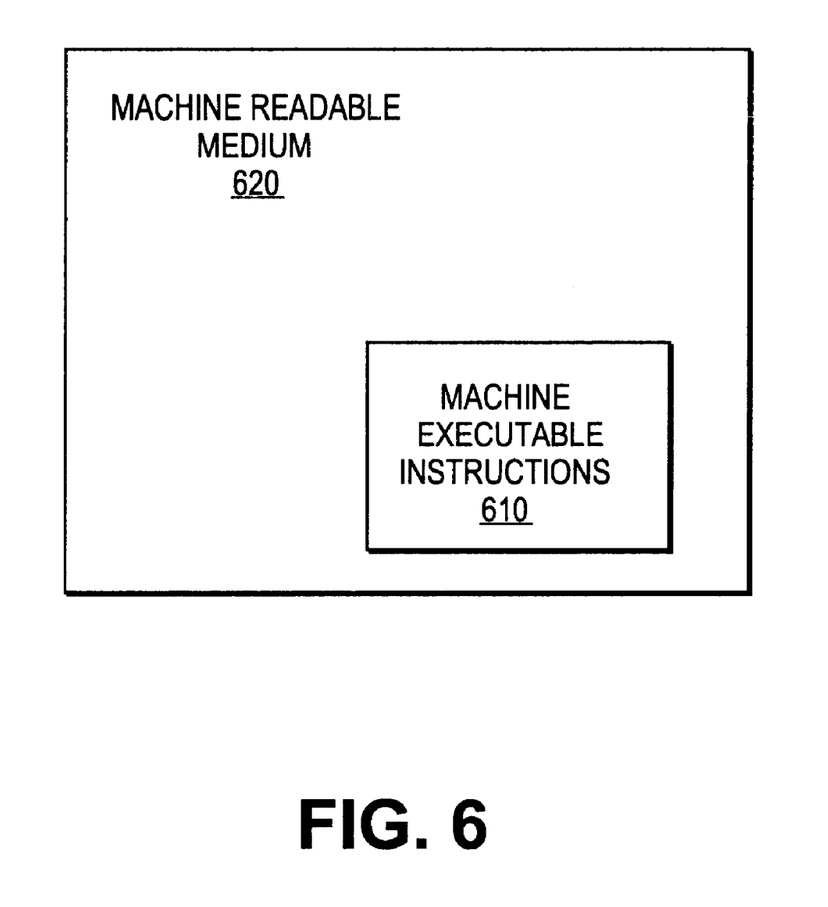
FIG. 6 illustrates one embodiment of a machine readable storage medium.

As an alternative, as shown in FIG. 6, the functionality of the present invention can be embodied in machine executable instructions 610 stored using any machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 550 of FIG. 5.

From whatever source, the instructions may be executed in place and/or copied from the storage device into, for instance, ROM 525 and then executed by a processor, such as processor 510. The software routines of the present invention may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

In one embodiment, once the computer system components are initialized, operating system files can be loaded into executable memory, such as RAM 520, by the BIOS from, for instance, mass storage 540. Alternately, the files can be loaded over a network connection (as for a diskless system) through, for instance, I/O device(s) 550.

Thus, a method and apparatus to improve a remote boot process is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
  receiving remote boot parameters at a remote boot wrapper from a basic input-output system (BIOS) of an electronic system during a system boot;
  determining if a quick remote boot is enabled based at least in part on the remote boot parameters;
  bypassing a remote boot configuration interface if the quick remote boot is enabled; and
  performing the remote boot configuration interface if the quick remote boot is not enabled.

2. The method of claim 1 wherein, prior to determining if the quick remote boot is enabled, the method further comprises:
  determining if the boot parameters include a valid remote boot signature;
  continuing with the system boot without further remote boot wrapper action if the boot parameters do not include the valid remote boot signature; and
  continuing with the remote boot wrapper if the boot parameters do include the valid remote boot signature.

3. The method of claim 1 wherein performing the remote boot configuration interface comprises:
  displaying a remote boot wrapper window;
  prompting for access to a configuration mode; and
  displaying a configuration menu if the configuration mode is accessed.

4. The method of claim 1 wherein bypassing the remote boot configuration interface comprises:
  reducing a delay in the system boot introduced by the remote boot wrapper.

5. The method of claim 1 further comprising:
  configuring the remote boot wrapper to enable the electronic system to initialize with respect to a remote entity.

6. The method of claim 5 wherein configuring the remote boot wrapper comprises:
  configuring based at least in part on selected configuration settings if configuration settings are selected in a configuration mode accessed through the remote boot configuration interface; and
  configuring based at least in part on a default configuration setting if the remote boot configuration interface is bypassed or if the configuration mode is not accessed through the remote boot configuration interface.

7. The method of claim 5 wherein the remote entity comprises at least one of a network and a peripheral device.

8. The method of claim 7 wherein the network comprises one of a local area network, a metropolitan area network, and a wide area network.

9. The method of claim 7 wherein the peripheral device comprises a small computer system interface (SCSI) device.

10. The method of claim 5 wherein configuring the remote boot wrapper comprises:
  selecting a remote boot agent within the remote boot wrapper.

11. The method of claim 1 further comprising:
  activating a remote boot agent based at least in part on a configuration of the remote boot wrapper.

12. The method of claim 11 wherein activating the remote boot agent comprises:
  finding a boot server on a network at a location indicated by the configuration parameters;
  downloading a remote boot script from the boot server; and
  executing the remote boot script.

13. The method of claim 1 wherein the electronic system comprises a diskless system.

14. The method of claim 1 wherein the boot parameters comprise at least one of an American standard code for information interchange (ASCII) signature for remote boot validation and a binary parameter for quick boot enablement.

15. An article comprising:
  a storage medium having stored thereon machine-readable instructions to implement a method comprising:
    receiving remote boot parameters at a remote boot wrapper from a basic input-output system (BIOS) of an electronic system during a system boot;

determining if a quick remote boot is enabled based at least in part on the remote boot parameters;

bypassing a remote boot configuration interface if the quick remote boot is enabled; and performing the remote boot configuration interface if the quick remote boot is not enabled.

16. The article of claim 15 wherein, prior to determining if the quick remote boot is enabled, the method further comprises:

determining if the boot parameters include a valid remote boot signature;

continuing with the system boot without further remote boot wrapper action if the boot parameters do not include the valid remote boot signature; and continuing with the remote boot wrapper if the boot parameters do include the valid remote boot signature.

17. The article of claim 15 wherein performing the remote boot configuration interface comprises:

displaying a remote boot wrapper window;

prompting for access to a configuration mode; and displaying a configuration menu if the configuration mode is accessed.

18. The article of claim 15 wherein the method further comprises:

configuring the remote boot wrapper to enable the electronic system to initialize with respect to a remote entity.

19. The article of claim 18 wherein configuring the remote boot wrapper comprises:

configuring based at least in part on selected configuration settings if configuration settings are selected in a configuration mode accessed through the remote boot configuration interface; and configuring based at least in part on a default configuration setting if the remote boot configuration interface is bypassed or if the configuration mode is not accessed through the remote boot configuration interface.

20. The article of claim 18 wherein configuring the remote boot wrapper comprises:

selecting a remote boot agent within the remote boot wrapper.

21. The article of claim 15 wherein the method further comprises:

activating a remote boot agent based at least in part on a configuration of the remote boot wrapper.

22. The article of claim 21 wherein activating the remote boot agent comprises:

finding a boot server on a network at a location indicated by the configuration parameters;

downloading a remote boot script from the boot server; and executing the remote boot script.

23. An apparatus comprising:

a remote boot wrapper to couple to an electronic system, said remote boot wrapper to receive remote boot parameters from a basic input-output system (BIOS) of the electronic system during a system boot;

determine if a quick remote boot is enabled based at least in part on the remote boot parameters;

bypass a remote boot configuration interface if the quick remote boot is enabled; and perform the remote boot configuration interface if the quick remote boot is not enabled.

24. The apparatus of claim 23 wherein, prior to determining if the quick remote boot is enabled, the remote boot wrapper is further to:

determine if the boot parameters include a valid remote boot signature;

continue with the system boot without further remote boot wrapper action if the boot parameters do not include the valid remote boot signature; and continue with the remote boot wrapper if the boot parameters do include the valid remote boot signature.

25. The apparatus of claim 23 wherein, to perform the remote boot configuration interface, the remote boot wrapper is to:

display a remote boot wrapper window;

prompt for access to a configuration mode; and display a configuration menu if the configuration mode is accessed.

26. The apparatus of claim 23 wherein the remote boot wrapper is configured to enable the electronic system to initialize with respect to a remote entity.

27. The apparatus of claim 26 wherein the remote boot wrapper is configured based at least in part on selected configuration settings if configuration settings are selected in a configuration mode accessed through the remote boot configuration interface, and configured based at least in part on a default configuration setting if the remote boot configuration interface is bypassed or if the configuration mode is not accessed through the remote boot configuration interface.

28. The apparatus of claim 23 wherein the remote boot wrapper is to activate a remote boot agent based at least in part on a configuration of the remote boot wrapper.

29. The apparatus of claim 28 wherein the remote boot agent is to:

find a boot server on a network at a location indicated by the configuration parameters;

download a remote boot script from the boot server; and execute the remote boot script.

* * * * *